(12) United States Patent
Dee (10) Patent No.: US 8,463,905 B2
(45) Date of Patent: *Jun. 11, 2013

(54) DRIFT VISUALIZATION

(75) Inventor: Stephanie Dee, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,471

(22) Filed: Feb. 22, 2012

(65) Prior Publication Data

US 2012/0209993 A1    Aug. 16, 2012

Related U.S. Application Data

(63) Continuation of application No. 12/353,309, filed on Jan. 14, 2009, now Pat. No. 8,145,752.

(51) Int. Cl.
  *G06F 15/16*    (2006.01)
  *G06F 15/173*    (2006.01)
(52) U.S. Cl.
  USPC ............ 709/224; 709/203; 709/223; 715/736
(58) Field of Classification Search
  USPC .................... 709/220, 223, 224; 707/10, 30
  See application file for complete search history.

(56) References Cited

U.S. PATENT DOCUMENTS

| | | | |
|---|---|---|---|
| 7,194,538 B1 * | 3/2007 | Rabe et al. | 709/224 |
| 7,233,957 B1 | 6/2007 | Sheehy et al. | |
| 7,653,712 B1 * | 1/2010 | Dubrovsky et al. | 709/223 |
| 7,685,261 B1 * | 3/2010 | Marinelli et al. | 709/220 |
| 2003/0154267 A1 | 8/2003 | Camacho et al. | |
| 2003/0208589 A1 | 11/2003 | Yamamoto | |
| 2004/0267644 A1 * | 12/2004 | Feco et al. | 705/30 |
| 2008/0226044 A1 * | 9/2008 | Johnson | 379/93.12 |
| 2009/0157699 A1 * | 6/2009 | Ohata et al. | 707/10 |
| 2010/0185596 A1 | 7/2010 | Dee | |

* cited by examiner

*Primary Examiner* — Quang N Nguyen (57) ABSTRACT

A system for drift visualization of change data of a data center is disclosed. The data center includes a plurality of configuration items. The system includes a management server in communication with the data center. The management server includes an agent configured to collect the change data from one or more of the plurality of configuration items. A change datastore in communication with the management server is provided to store the change data. A data extractor in communication with the change datastore retrieves the change data and provides a filtered subset of the change data to a display. A policy datastore enables the data extractor to filter the change data based on data center policy violations. The visualization depicts multiple dimensions of change-related data for the items in the data center in a unique and concise manner.

12 Claims, 6 Drawing Sheets

<dates totalDates="5">
        <date id="d0" value="12/31/1969"/>
        <date id="d1" value="01/01/1970"/>
        <date id="d2" value="01/02/1970"/>
        <date id="d3" value="01/03/1970"/>
        <date id="d4" value="01/04/1970"/>
    </dates>
    <drift numCIGroup="2">
        <ciGroup name="name1" type="type1" id="id1" count="13">
            <d0 numChanges="0" numViolations="0" policyStatus="good"/>
            <d1 numChanges="8" numViolations="0" policyStatus="good"/>
            <d2 numChanges="4" numViolations="0" policyStatus="good"/>
            <d3 numChanges="5" numViolations="3" policyStatus="bad"/>
            <d4 numChanges="2" numViolations="1" policyStatus="bad"/>
        </ciGroup>
        <ciGroup name="name2" type="type2" id="id2" count="11">
            <d0 numChanges="0" numViolations="3" policyStatus="bad"/>
            <d1 numChanges= "3" numViolations="3" policyStatus="bad"/>
            <d2 numChanges="4" numViolations="2" policyStatus="bad"/>
            <d3 numChanges="3" numViolations="1" policyStatus="bad"/>
            <d4 numChanges="2" numViolations="0" policyStatus="good"/>
        </ciGroup>
    </drift>

DRIFT VISUALIZATION

CROSS REFERENCE TO RELATED APPLICATIONS

This application is a continuation of the U.S. patent application Ser. No. 12/353,309 filed on Jan. 14, 2009, entitled "Drift Visualization," which issued on Mar. 27, 2012 as U.S. Pat. No. 8,145,752.

BACKGROUND

A typical data center may consist of a large number of physical computers and virtual machines. These computing resources service hundreds of software applications that cater to a large number of users on a twenty four by seven basis. Misconfigured software and hardware are one of the leading causes of failure in large modern data centers. The administrators of these data centers must constantly track configuration changes across millions of configuration items (CIs), always on the lookout for changes that may soon be or may have recently caused problems. Once they find configuration problems, they must be able to easily communicate these problems, or the trends that created the problems, to their peers and superiors, to justify corrective measures. Currently, the drift visualizations available to process this data are insufficient for the task. They either show only a limited amount of data, or merely list all the data associated with all changes in the data center environment. In neither case can the administrator easily pick relevant changes out of the summation of the information available, or easily identify and communicate negative configuration trends that imply larger administrative problems.

SUMMARY

In one embodiment, a system for drift visualization of change data of a data center is disclosed. The data center includes a plurality of configuration items. The system includes a management server in communication with the data center. The management server includes an agent configured to collect the change data from one or more of the plurality of configuration items. A change database that is in communication with the management server is provided to store the change data. A data extractor in communication with the change datastore is provided to retrieve the change data and provide a filtered subset of the change data to a display. A policy datastore in communication with the data extractor is provided to enable the data extractor to filter the change data based on data center policy violations.

In another embodiment, a method for drift visualization of change data of a data center is provided. The data center includes a plurality of configuration items. The method includes continuously monitoring one or more of the plurality of configuration items for changes in computing resource characteristics. The changes in the computing resource characteristics are detected through the continuous monitoring of the configuration items. The computing resource characteristics include hardware and software configurations and operations being performed on the one or more of the plurality of configuration items. The changes are stored in a datastore. The method further includes providing a graphical visualization of a subset of the changes. The subset is defined through a query that is formatted for retrieve the subset from the datastore.

In yet another embodiment, a computer readable media having programming instructions for drift visualization of change data of a data center is provided. The data center includes a plurality of configuration items. The computer readable media includes programming instructions for continuously monitoring one or more of the plurality of configuration items for changes in computing resource characteristics and programming instructions for detecting changes in the computing resource characteristics. The computing resource characteristics include hardware and software configurations and operations being performed on the one or more of the plurality of configuration items. The computer readable media further includes programming instructions for storing the changes in a datastore, and programming instructions for providing a graphical visualization of a subset of the changes. The subset is defined through a query that is formatted for retrieve the subset from the datastore.

DETAILED DESCRIPTION

Figure 1:
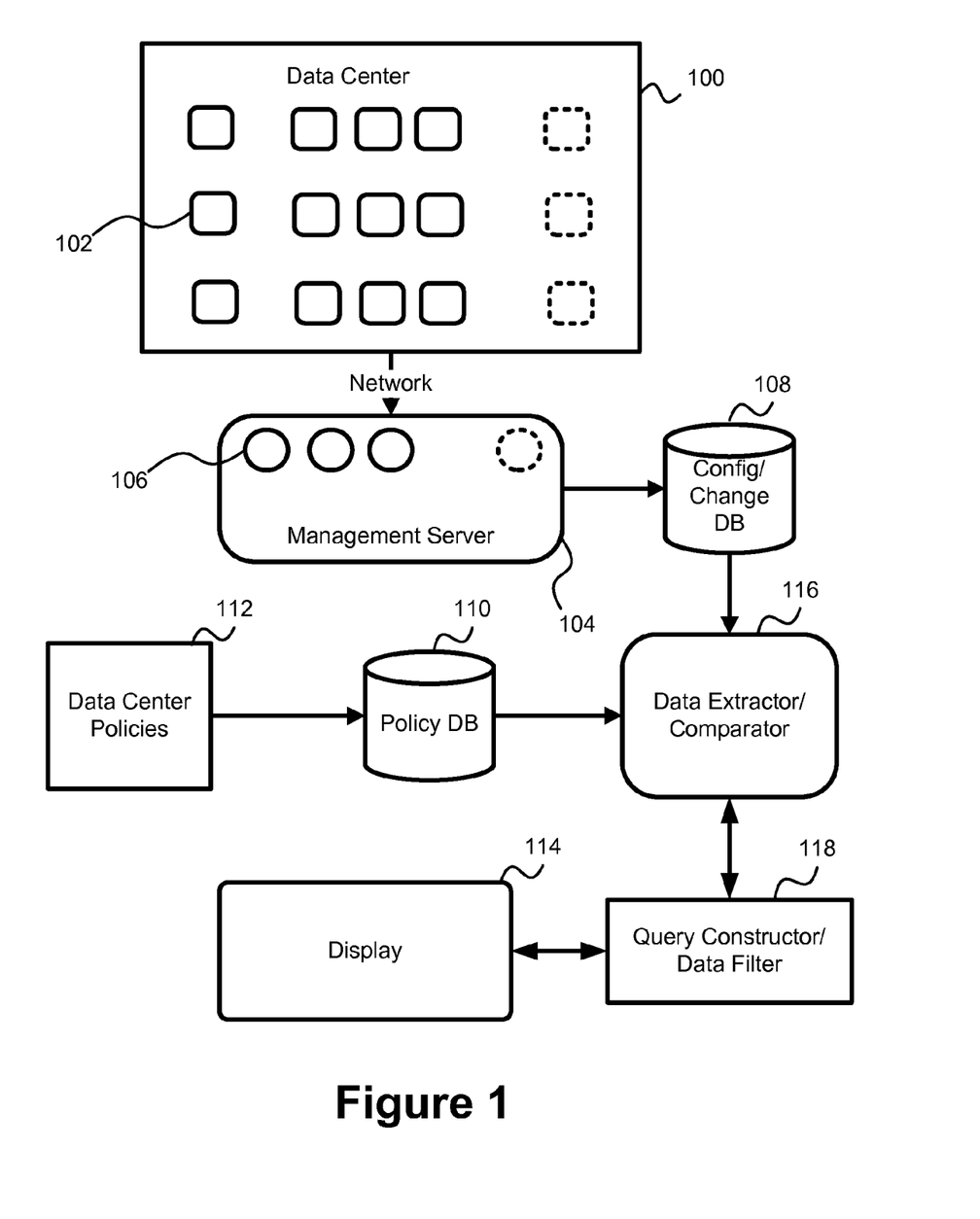
FIG. 1 illustrates an exemplary system for collecting and displaying drift data from a data center in accordance with one or more embodiments of the present invention.

FIG. 1 illustrates an exemplary system for collecting data center change information and displaying a drift visualization of the changes during a period of time. A data center 100 is a logical collection of a plurality of computing resources. In one example, a computing resource 102 can be one of a physical computer system, a virtual computer system (i.e., a virtual machine), a network switch, a storage system, or any other resource that is needed for operating a data center. A Management Server 104 (e.g., VMware vCenter, Microsoft System Center, etc.) is used to collect configuration and usage change data from data center 100. Management Server 104, in one embodiment, is made aware of either all or a subset of the computing resources in Data center 100. In this embodiment, Management Server 104 can be used to configure and manage computing resources in Data Center 100. Management Server 104 is connected to Data Center 100 either through a private networking connection or through the Internet.

Management Server 104 periodically queries each of the managed resources to retrieve changes since the last query. However, Management Server 104 may not be aware of the particular characteristics of each of the managed resources in Data Center 100. Hence, in one embodiment, Management Server 104 uses one or more resource agents 106. A particular resource agent 106 provides Management Server 106 an access to a particular type of computing resource. For example, a particular type of agent would provide access to Cisco Switch or VMware VM or IBM NAS. In one embodiment, Management Server 104 may be unable to query a particular type of data center resource if an agent for that particular type of data center resource is not available to Management Server 104.

In another embodiment, another type of agents can be installed in each of the managed data center resources. These agents will periodically send the change information to Management Server 104. In another embodiment, these agents will send the information to Management Server 104 as and when any change in the configuration, settings, or status of a particular data center resource occurs.

The change information that is collected from various configuration items, such as virtual machines, physical hosts, networks, switches, user profiles, etc. is related to various hardware and software configurations, network settings, application settings, storage settings, storage capacities, bandwidth settings, etc. In another embodiment, the change information also relates to the operations ordinarily performed on network switches, virtual machines, hosts, etc. For example, a process of taking snapshots of a virtual machine is an operation that is performed on a virtual machine.

Management Server 104 stores this change information in a Config/Change database (DB) 108. Config/Change DB 108 is a datastore that is coupled to Management Server 104 through an appropriate protocol. In one embodiment, Config/Change DB 108 is a relational database management system (RDBMS). In another embodiment, Config/Change DB 108 is any datastore that is capable of storing information that can be retrieved through any ordinarily available means. In one embodiment, the change information is stored in a tabular format. In other embodiment, the change information is stored in XML format. In yet another embodiment, the change information can be stored in any format so long as the stored information can be retrieved through filtered queries.

To extract data from Config/Change DB 108, a Data Extractor/Comparator 116 is provided. In one embodiment, Data Extractor/Comparator 116 is implemented in a commonly available Web server using one or more technologies such as JAVA Servlets, JAVA Server Pages, Active Server Pages, HTML etc. In other embodiments, Data Extractor/Comparator 116 can be implemented in any manner so long as Data Extractor/Comparator 116 is capable of communicating with Config/Change DB 108 to retrieve data from Config/Change DB 108, based on search queries.

A Policy DB 110 is provided to store data center policies. Data center policies, in one embodiment, include a set of rules that should be maintained for the efficient operations of Data center 100. In one example, data center policies include rules that dictate the maximum number of snapshots per virtual machine, the setup of virtual hardware (such as virtual CD drives) in virtual machines, the number of applications that can be installed on a physical or virtual machine, the maximum number of virtual machines per physical machine, etc. Data center Policies 112 are configured by a data center administrator, who can format these policies based on one or more data center optimization and security schemes. For example, a rule to limit a maximum number snapshots of a virtual machine (VM) is important for performance optimization of a data center because maintaining a large number of virtual machine snapshots is a time and resource consuming process. Similarly, installing a certain kind of virtual or physical hardware may pose security risks.

Data Extractor/Comparator 116 is also coupled to a Query Constructor/Data Filter 118 module. Query Constructor/Data Filter 118 provides functionality to help format queries to extract a subset of data based on a desired view of the change data that need to be displayed on a Display 114. In one embodiment, Data Extractor/Comparator 116 and Query Constructor/Data Filter 118 can be implemented in the same software module using one or more of generally available technologies such as JAVA Servlets, JAVA Server Pages, Active Server Page, etc. In another embodiment, smart UI clients such as Adobe Flex UI™ may be used to provide filter and display logic. Display 114, in one embodiment, is a Web browser. In other embodiments, Display 114 can be any computer display that is capable of displaying data formatted and presented to Display 114 in a generally available display means such as HTML, XML, JAVA™ Applets, etc.

Figure 2:
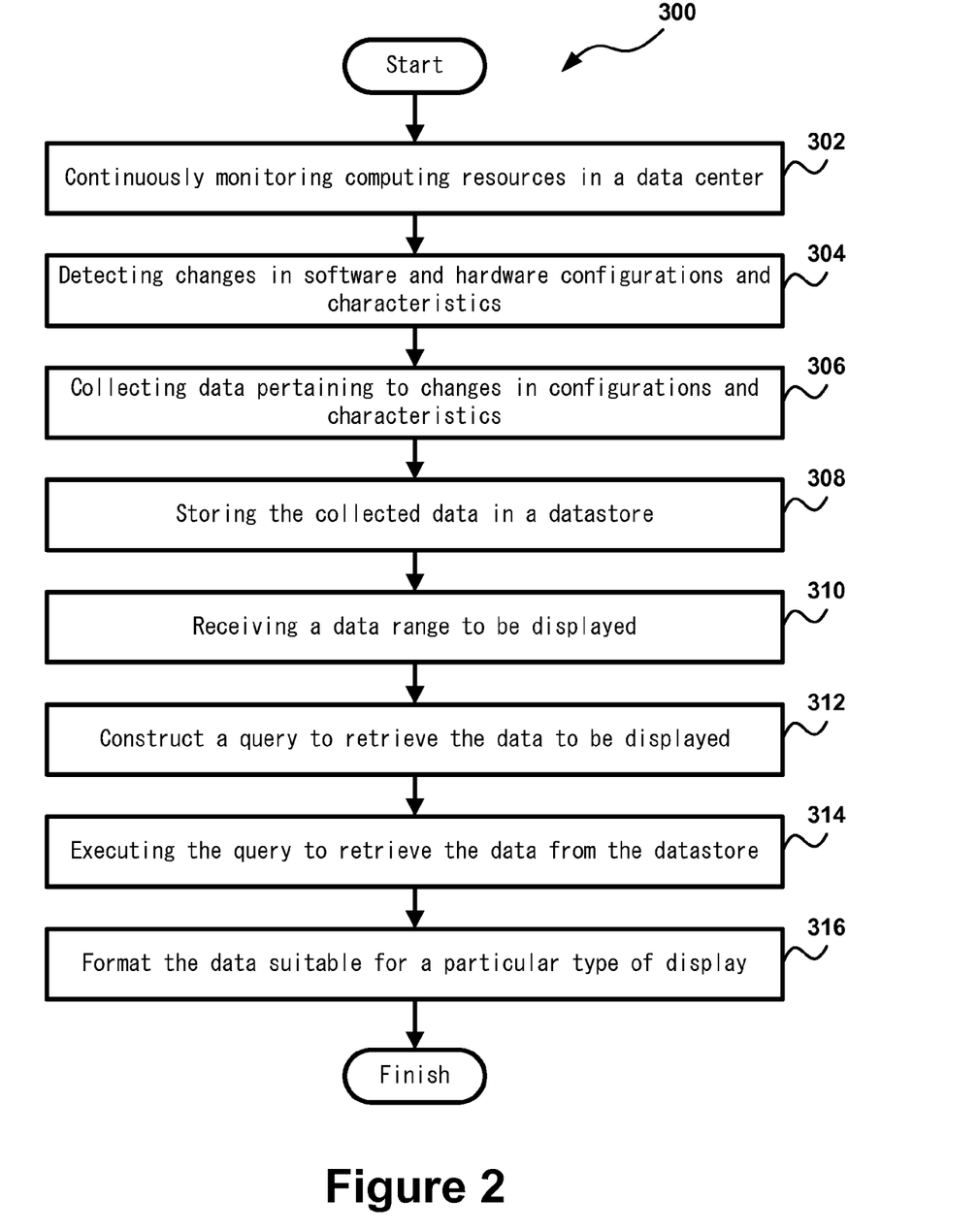
FIG. 2 illustrates a process of retrieving configuration change data and formatting data for drift visualization in accordance with or more embodiments of the present invention.

FIG. 2 illustrates a process 300 of retrieving and displaying change data. At step 302, various computing resources of a data center are continuously monitored using agents, each configured to monitor a particular type of computing resource. In one embodiment, these agents reside outside of the computing resources being monitored. In another embodiment, the agents may reside in the computing resources themselves and send data to a computer center manager module as and when the data changes. Alternatively, the data can be sent to the computer center manager periodically. In yet another embodiment, some agents reside in the computing resources and some agents reside in the computer center manager.

At step 304, an agent detects a change in software or hardware configuration or in the characteristics of the computing resource being monitored by that agent. In one example, an agent detects a change by reading the entries in a log file that is being maintained to record the operations of a computing resource.

At step 306, the agent collects data pertaining to changes in configurations and characteristics and at step 308 this data is stored in a datastore or database. Steps 302 to 308 are repeated continuously.

To display a filtered view of this stored data, at step 310, a range of data that needs to be displayed is received from a display. For example, a change data of selected computing resources between two date/times may be desired to be displayed on a computer display. In this example, at step 312, a query is formatted by a query constructor module to enable a data extractor to retrieve a subset of data between these two data/times for selected computing resources from the datastore. The type of query depends on the type of datastore. For example, if the datastore is an RDBMS, an SQL query may be constructed. At step 314, the query is executed to retrieve the subset of data from the datastore. At step 316, the retrieved data is formatted to conform to a type of the computer display. For example, the data can be provided in XML form or HTML form to the display.

Figure 3:
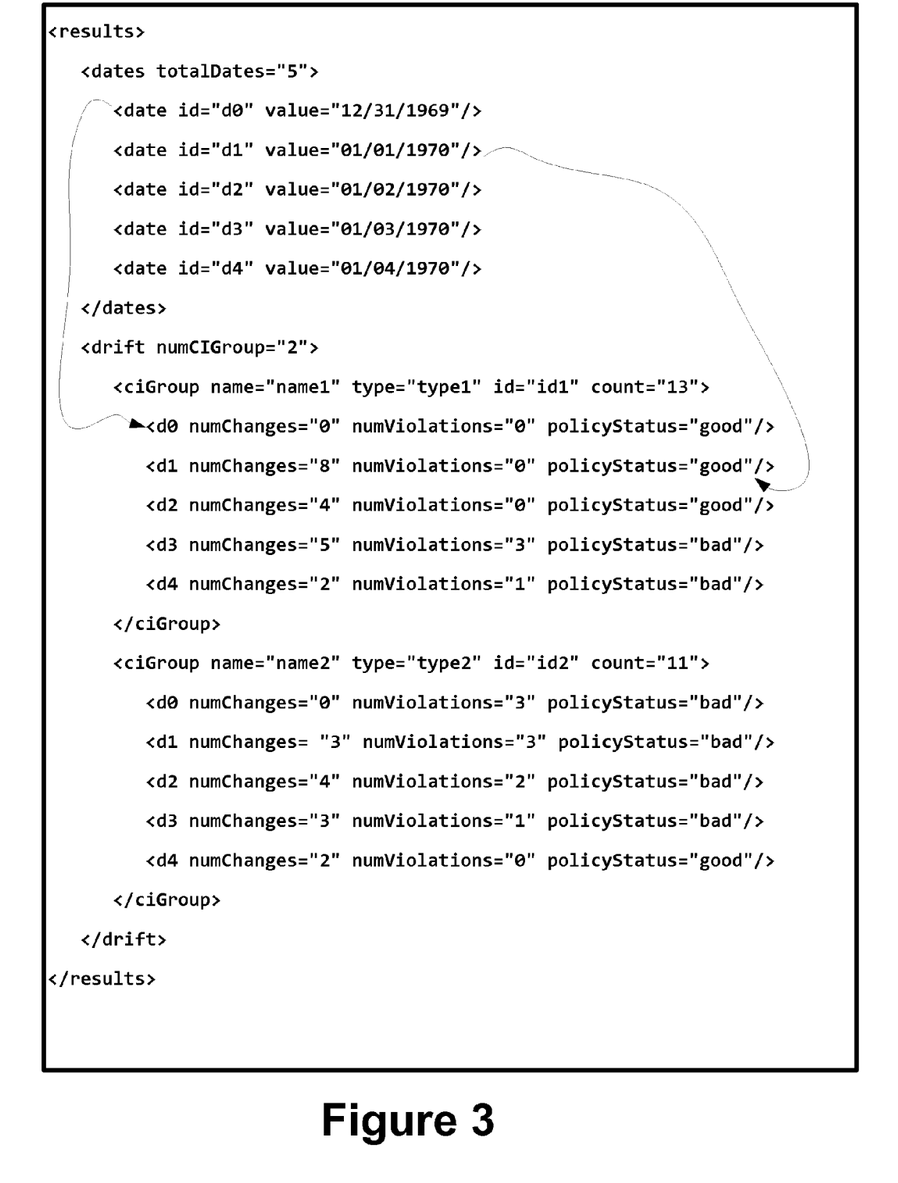
FIG. 3 illustrates an exemplary drift data structure formatted for display in accordance with one or more embodiments of the present invention.

FIG. 3 illustrates a section of a sample of a XML document, which is outputted from Data Extractor/Comparator 116 (FIG. 1) in response to a query. As apparent, the XML document includes various tags and data. In one embodiment, the returned data is arranged by date/time. Date Tag are then associated with the tags that represent computing resources and corresponding drift or change data. It should be noted that the data extractor can output data in other formats, such as HTML, Text, Binary, or a UI vendor specific format.

Figure 4:
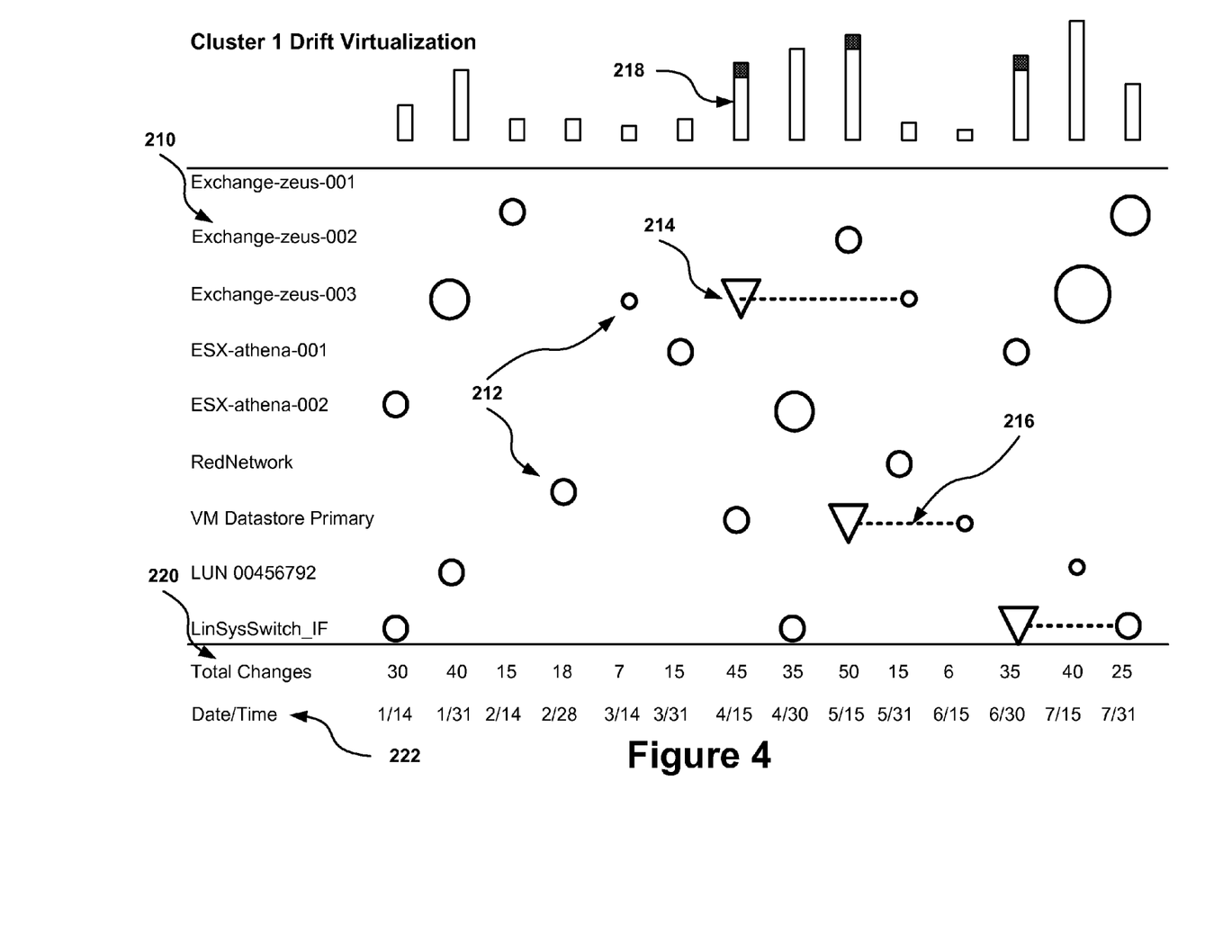
FIG. 4 illustrates exemplary drift visualization in accordance with one or more embodiments of the present invention.

FIG. 4 illustrates an exemplary drift visualization of change data of an exemplary cluster in a data center. The exemplary visualization in FIG. 4 is based on a query which is designed to trigger the extraction of drift or change data for a selected set of configuration items (CIs) 210 between two exemplary dates 222, January 14 and July 31, from a data center. It should be noted that the visualization shown in FIG. 4 is just one of many possible types of visualizations. The drift visualization can be modified by formatting a query to extract desired data for display and by modifying visual representation and format of the data.

As illustrated in FIG. 4, numbers of changes for each CIs 210 are shown in front of each CIs for a particular date. In one embodiment, the numbers of changes are represented by a visual object such as a circle 212. In one embodiment, the size of the visual object is directly proportional to the numbers of changes. In another embodiment, a size of the visual object represents a range of changes. For example, a particular size of the visual object may represent a number between 20 and 50 (i.e., the number of changes). It may be noted that any other visual object can be used instead of a circle so long as the size of the visual object can provide a visual presentation of the number of changes. Further, in other embodiments, different color schemes may be used to show different ranges of changes in CIs.

In one embodiment, the drift visualization also shows total number of changes 220 in all displayed CIs for a particular date. In another embodiment, the total number of changes is also displayed in a graphical form 218.

In one or more embodiments, another shape or colored visual object (e.g., a triangle 214 in this example) may be used to show changes in CIs that are in violation of data center policies. In one embodiment, a persistence of a violation may also be shown (e.g., a dotted line 216 in this example). This dotted line 216 shows for how long violations of data center policies lasted and the object at the other end of the dotted line represents a number of changes in CIs after violations are corrected, either manually or automatically.

In one embodiment, a graphical representation of the consolidated changes on a particular date 218 may also provide a graphical representation (represented by a dark tip in element 218 in this example, the size of the dark tip is proportional to the number of changes that violates data center policies) to indicate the number of changes that violated data center policies.

Figure 5A:
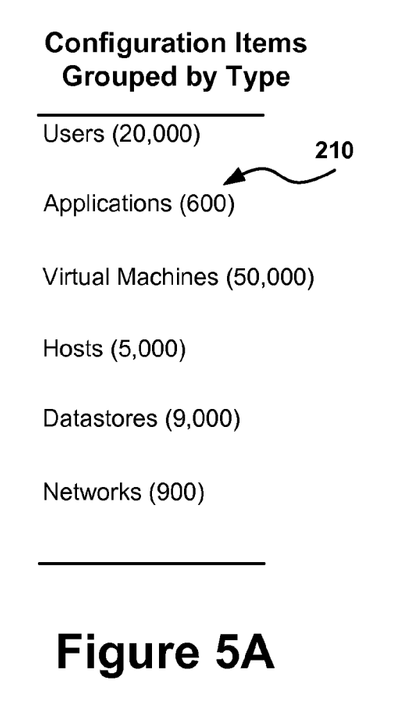
FIGS. 5A, 5B, and 5C illustrate various types of grouping of configuration items in drift visualization in accordance with one or more embodiments of the present invention.
Figure 5B:
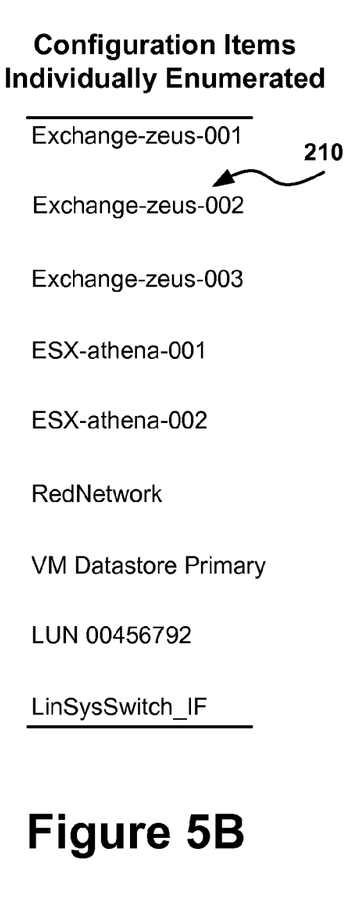
Figure 5C:
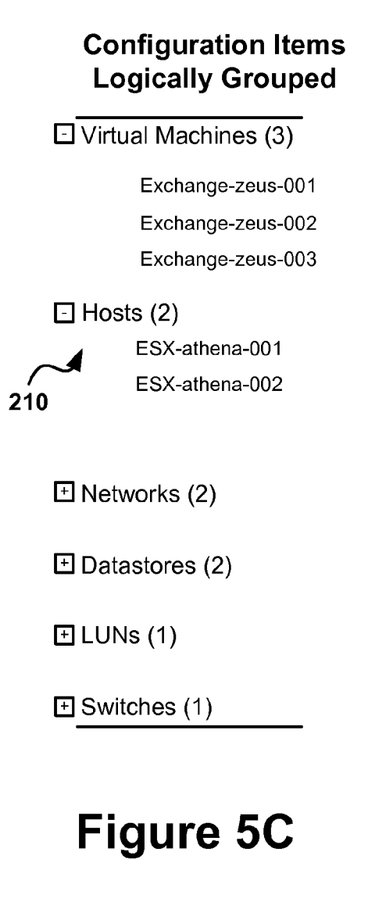

FIGS. 5A, 5B, and 5C illustrate various other embodiments drift visualization. In one embodiment, as illustrated in FIG. 5A, a query to extract the change/drift data is formatted to retrieve the change data grouped by CIs types such as Users, Applications, VMs, Hosts, Datastores and Networks. FIG. 5B illustrates another embodiment in which CIs are listed individually. For example, "Exchange-zeus-001" is the name of a virtual machine. FIG. 5C illustrates yet another embodiment in which CIs are grouped logically. That is, all virtual machines (VMs) in a cluster for which the drift visualization is being displayed are grouped together and changes in all of these VMs are consolidated together when the node representing this VM group is closed. When the node is opened, the drift data of each VM can be viewed. It may be noted that many other such groups and combinations are possible and limited only by the construction or formation of a query that extracts the drift data from a drift datastore.

Figure 6:
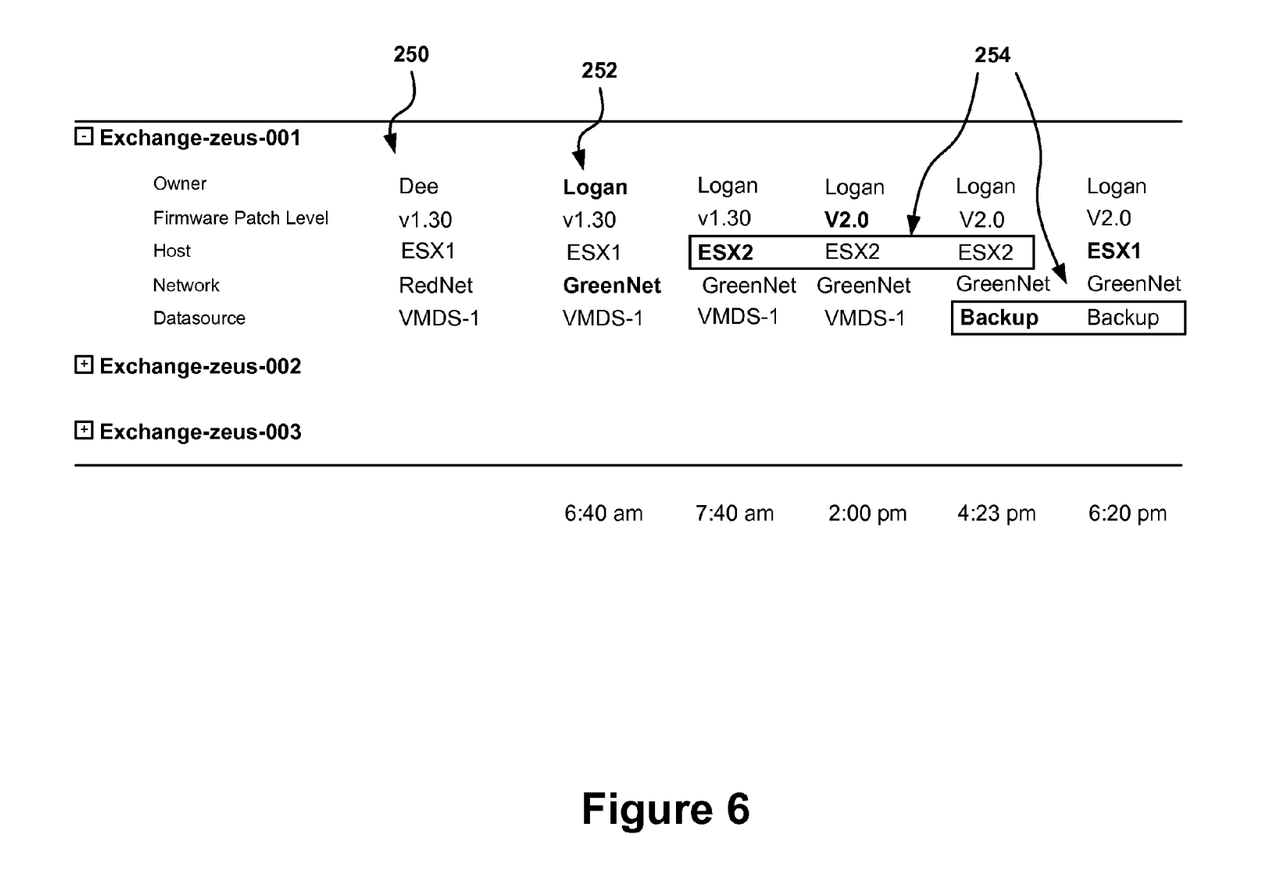
FIG. 6 illustrates a drill-down view of the drift visualization in accordance with one or embodiments.

The drift visualization that is illustrated in FIG. 4 is suitable for providing a visual summary of changes in parameter values and violations if any change in parameter values was a violation of a predefined data center policy. However, in order to take a corrective action, a data center administration would want to view the actual values of various properties and parameters being monitored for changes therein to identify which changes in parameter values cause one or more violations. FIG. 6 illustrates a drill-down view of the drift visualization. In one embodiment, this drill down view is accessible from the drift visualization view of FIG. 4. For example, a change dot 212 (FIG. 4) can be clicked to view the drill down drift visualization view of changes represented by a particular change dot or warning symbol 214.

It should be noted that the drill down drift visualization can be shown in different layouts. A person skilled in the art would realize that FIG. 6 illustrates only one of those several possible view layouts. The first column 250, in one embodiment, shows values of the properties and parameters being monitored, prior to a particular time or date (depending on the granularity of data). The subsequent columns in the exemplary view in FIG. 6 show values of respective properties and/or parameters at different times. For example the value of the parameter "Owner" of Exchange-zeus-001 system was "Dee" prior to 6:40 am on a certain day. At 6:40 am, the value changed to "Logan" 252 and then remained "Logan" during a particular period of time. However, the view does not indicate that such change in the value of the parameter "Owner" triggered a violation of policies because this change appears to be within an allowed range of the drift. However, when the host was changed from "ESX1" to "ESX2" at 7:40 am, this change triggered a policy violation. A policy violation visual representation 254 is shown in the drill down drift visualization view. Policy violation visual representation 254 includes a visual representation of the period for which the violation remained in place. In one embodiment, this violation occurred because accordingly to a policy, the virtual machine "Exchange-zeus-001" was expected to remain being hosted at "ESX1" virtualization system.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the makeup of the data center. The drift visualization can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for visualization of change data of a data center, the data center including a plurality of configuration items, the method comprising:
   continuously monitoring one or more of the plurality of configuration items for changes in computing resource characteristics;
   detecting changes in the computing resource characteristics being monitored, wherein the computing resource characteristics being monitored include hardware and software configurations and operations being performed on the plurality of configuration items;
   storing the changes which are detected in a datastore; and
   providing a graphical visualization of a subset of the changes, including defining the subset through a query that is formatted to retrieve specified changes from the datastore, and further including presenting the graphical visualization to show the specified changes detected on a first date and the specified changes detected on a second date.

2. The method as recited in claim 1 wherein the configuration items include at least one of a virtual machine, a user, a network, a datastore, a switch, and a logical unit number (LUN).

3. The method as recited in claim 1 wherein providing the graphical visualization includes providing a graphical representation of the changes on the first and second dates.

4. The method as recited in claim 1 wherein providing the graphical visualization includes providing a graphical representation that shows a visual object whose size or color is based on a particular number of changes.

5. The method as recited in claim 1 wherein providing the graphical visualization includes providing a graphical representation of changes, on a particular date, in the computer resource characteristics for a logical group of configuration items of the plurality of configuration items.

6. The method as recited in claim 1 further including providing a drill down into the graphical visualization of the subset of the changes to show parameter values during a period of time.

7. The method as recited in claim 6 wherein providing the drill down includes showing the parameter values that caused policy violations.

8. A non-transitory computer readable media having programming instructions for drift visualization of change data of a data center, the data center including a plurality of configuration items, the non-transitory computer readable media comprising:
   programming instructions for continuously monitoring one or more of the plurality of configuration items for changes in computing resource characteristics;
   programming instructions for detecting changes in the computing resource characteristics being monitored, wherein the computing resource characteristics being monitored include hardware and software configurations and operations being performed on the plurality of configuration items;
   programming instructions for storing the changes which are detected in a datastore; and
   programming instructions for providing a graphical visualization of a subset of the changes, including defining the subset through a query that is formatted to retrieve specified changes from the datastore, and further including presenting the graphical visualization to show the specified changes detected on a first date and the specified changes detected on a second date.

9. The non-transitory computer readable media as recited in claim 8 wherein the plurality of configuration items include at least one of a virtual machine, a user, a network, a datastore, a switch, and a logical unit number (LUN).

10. The non-transitory computer readable media as recited in claim 8 wherein programming instructions for providing the graphical visualization include programming instructions for providing a graphical representation of changes, on a particular date, in the computer resource characteristics for the one or more of the plurality of configuration items.

11. The non-transitory computer readable media as recited in claim 8 wherein programming instructions for providing the graphical visualization include programming instructions for providing a graphical representation that shows a visual object whose size or color is based on a particular number of changes.

12. The non-transitory computer readable media as recited in claim 8 wherein programming instructions for providing the graphical visualization include programming instructions for providing a graphical representation of changes, on a particular date, in the computer resource characteristics for a logical group of configuration items of the plurality of configuration items.

* * * * *